Figure 3:
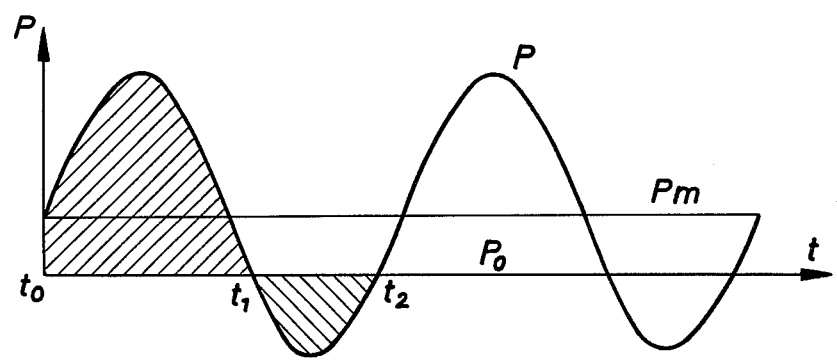

United States Patent [19]

Geislinger

[11] 4,104,891
[45] Aug. 8, 1978

[54] TORSIONALLY ELASTIC MECHANISM

[76] Inventor: Leonhard Geislinger, Hofelgasse 26, Salzburg, Austria

[21] Appl. No.: 739,111

[22] Filed: Nov. 5, 1976

[30] Foreign Application Priority Data

Nov. 13, 1975 [AT] Austria .................. 8671/75

[51] Int. Cl.² .............................................. F16D 3/14
[52] U.S. Cl. ........................................ 64/26; 64/27 L
[58] Field of Search ............... 64/26, 27 L, 15 B, 1 V; 188/306, 308, 309

[56] References Cited

U.S. PATENT DOCUMENTS

| 1,920,273 | 8/1933 | Peo ...................... | 188/308 |
| 2,046,626 | 7/1936 | Herrmann ............. | 188/309 |
| 2,089,418 | 8/1937 | Peo ...................... | 188/309 |
| 2,096,468 | 10/1937 | Peo ...................... | 188/309 |
| 2,100,407 | 11/1937 | Peo ...................... | 188/309 |
| 2,334,340 | 11/1943 | Magrum ................. | 188/309 |
| 2,358,988 | 9/1944 | Magram ................. | 188/309 |
| 2,812,648 | 11/1957 | Croset .................... | 64/26 |
| 2,851,128 | 9/1958 | Kuhn ...................... | 188/309 |
| 3,996,767 | 12/1976 | Geislinger ............. | 64/27 L |

FOREIGN PATENT DOCUMENTS

| 1,375,937 | 9/1964 | France ........................... | 64/27 L |
| 1,206,219 | 12/1965 | Fed. Rep. of Germany ........ | 64/27 L |
| 1,234,003 | 6/1971 | United Kingdom ................. | 64/26 |

Primary Examiner—Benjamin W. Wyche
Assistant Examiner—R. C. Turner
Attorney, Agent, or Firm—Kurt Kelman

[57] ABSTRACT

A central portion includes an inner member. An outer member defines together with said inner member first and second chambers adapted to contain a liquid, and gap means through which said first and second chambers communicate with each other. A reservoir is contained in said central portion and adapted to contain liquid. Passage means connect said reservoir to at least part of said chambers and are adapted to conduct liquid from said reservoir to said chambers and from said chambers to said reservoir. Movable members are disposed in said passages and arranged to present a lower resistance to the flow of liquid from said reservoir to said chambers than to the flow of liquid from said chambers to said reservoir. Said inner and outer members are angularly movable relative to each other and arranged to displace liquid between said first and second chambers through said gap means during such angular movement so as to perform a torsional damping action.

2 Claims, 7 Drawing Figures

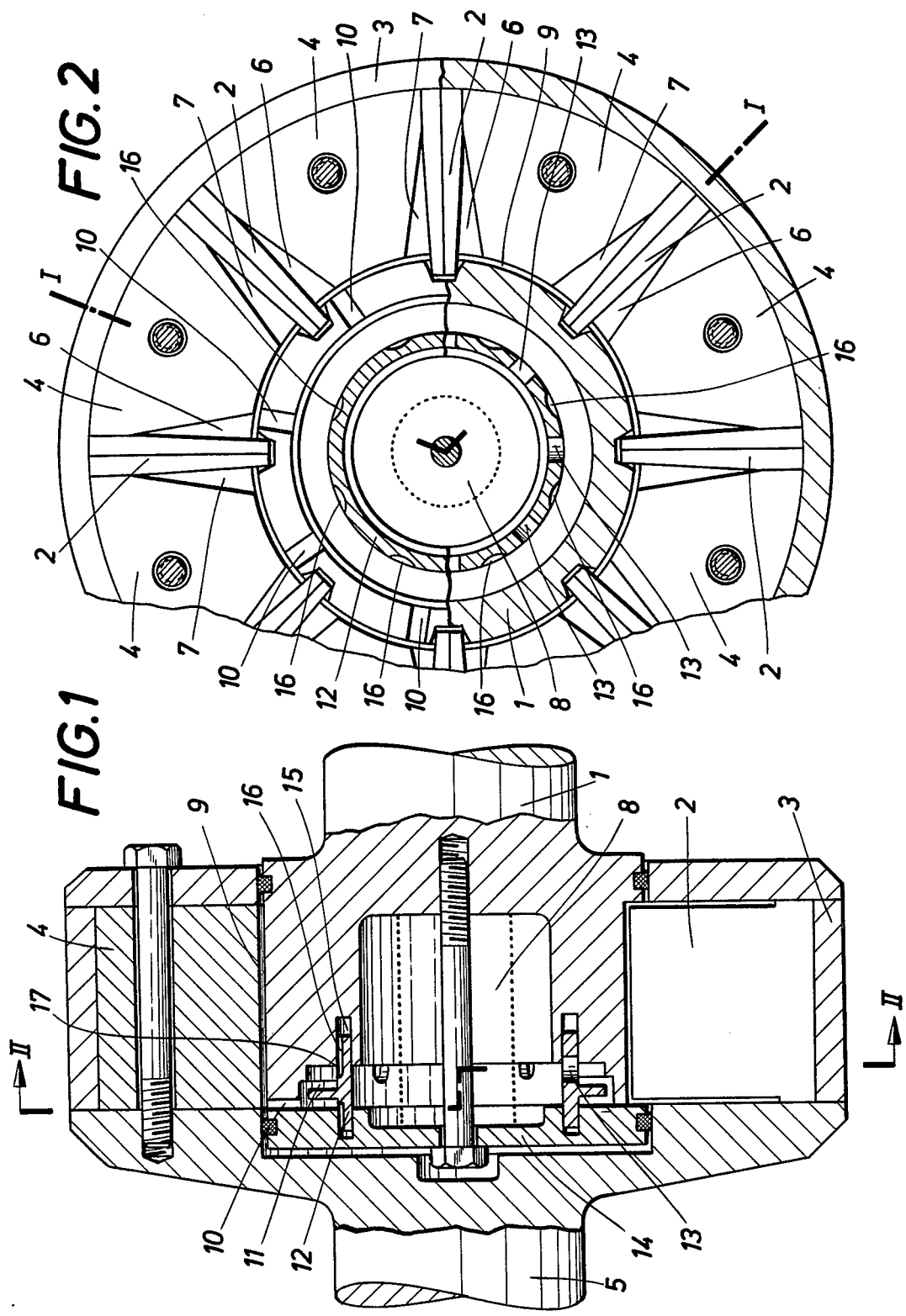

TORSIONALLY ELASTIC MECHANISM

This invention relates to a torsionally elastic damping and/or coupling mechanism for damping angular oscillation and/or for transmitting torque, in which liquid-filled chambers are defined by inner and outer members of the mechanism and a damping action is performed at least in part in that a movement of the inner and outer members relative to each other results in a displacement of the liquid through gaps between the chambers, at least part of which communicates through bores or passages with a reservoir for liquid.

In known torsionally elastic mechanisms for transmitting torque and for damping angular oscillations, sets of leaf springs of steel are disposed between primary and secondary members of the mechanism and are gripped at their outer ends. The leaf springs and the primary and secondary members define oil-filled chambers. During a angular movement of the primary member relative to the secondary member, the leaf springs are deflected so that oil is displaced to flow from one chamber into the adjacent chamber through gaps defined by the two parts. This pumping action results in a damping action, the magnitude of which depends, inter alia, on the dimensions of the gaps, the amplitude and frequency of the oscillation, and the mean pressure of the oil in the chambers. Other known flexible couplings have chambers which are connected to a conduit through which liquid under pressure is supplied to those chambers which are defined by leaf springs that are stressed in compression whereas the remaining chambers are connected to draining conduits. In that arrangement the liquid pressure can be increased so that the stress on the leaf springs is decreased. For that purpose the liquid must be supplied through the hollow shaft of one coupling member from a reservoir which is disposed outside the coupling and must be returned to the reservoir through the hollow shaft of the other coupling member so that the structural expenditure is considerably increased.

Such coupling and/or damping mechanisms have also various functional disadvantages. Whereas the strongest damping action is mostly required at the start of the system which includes the coupling and/or damping mechanism, the chambers will be empty or only partly filled with oil after a prolonged standstill and an excessively long time may be required to fill the chambers completely with oil. That time depends on the means for supplying oil to the chambers. A movement of the primary and secondary members of the coupling relative to each other results in a pulsation of the oil pressure in the chambers. The amplitude of these pulsating pressures is limited in dependence on the supply pressure. It has been found that the chambers will be emptied in part if the amplitude of the pulsating pressures exceeds about twice the supply pressure. The damping torque which can be exerted will be decreased if the chambers are filled with oil only in part.

It is an object of the invention so to improve the coupling and/or damping mechanism which has been described first hereinbefore that these disadvantages are avoided.

This object is accomplished according to the invention in that the reservoir is disposed in a central portion of the coupling and/or damping mechanism and the bores or passages incorporate movable members which present a higher resistance to the flow in the direction toward the chambers than to the flow in the direction toward the reservoir.

When a system incorporating the damping and/or coupling mechanism is started, this arrangement ensures that the chambers can be filled with oil or another liquid very quickly and that an emptying of the chambers is retarded. The structure of the entire system is simplified because conduits leading to the outside are omitted.

The movable members may consist of valve members of sliding or lift valves in which the cross-section of flow is adapted to be increased by a movement of the valve member caused by a flow of liquid from the reservoir to the chamber and to be decreased by a movement of the valve member caused by a flow in the opposite direction.

The movable members may consist of valve members of check valves. If these are designed to perform their function, there will be a risk that the movable members are seated as a result of each oscillation. Because the frequency of oscillation may be very high, the valve seats may be damaged within short time. This must be prevented by suitable measures. For instance, the valves may be provided with springs for damping the impact on the seat. In that case, the mass of the valve member or members and these springs constitute an oscillatable system and the natural frequency of that system may be highly disturbing. When sliding valves are used rather than the lift valves, there will also be the danger that the sliding valve members rather than the valve members of lift valves impinge on and damage the stroke-limiting means. To avoid that danger, it is a feature of the invention that the sliding valve members are adapted to be hydraulically braked when they have performed a predetermined movement from a neutral position.

Figure 4:
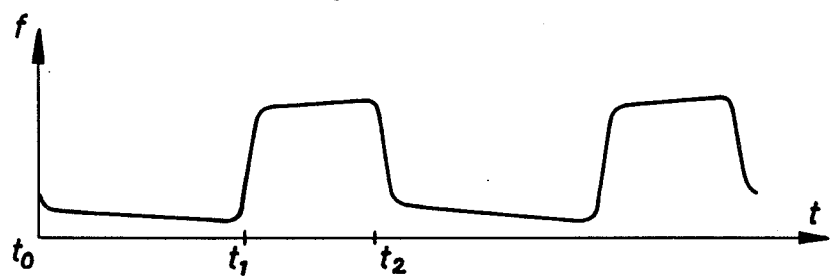
Figure 5:
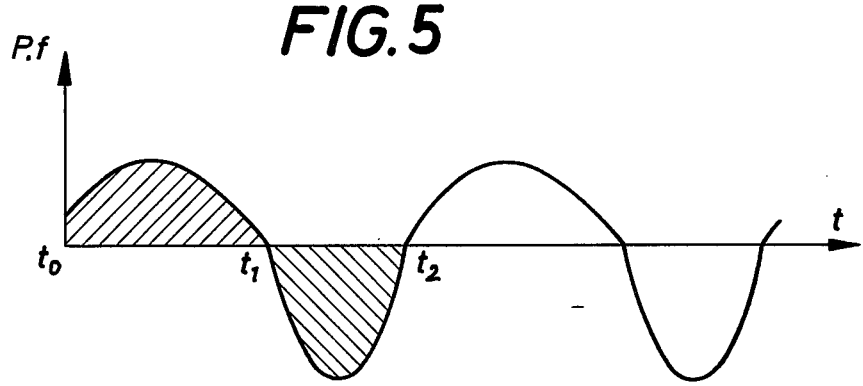
Figure 6:
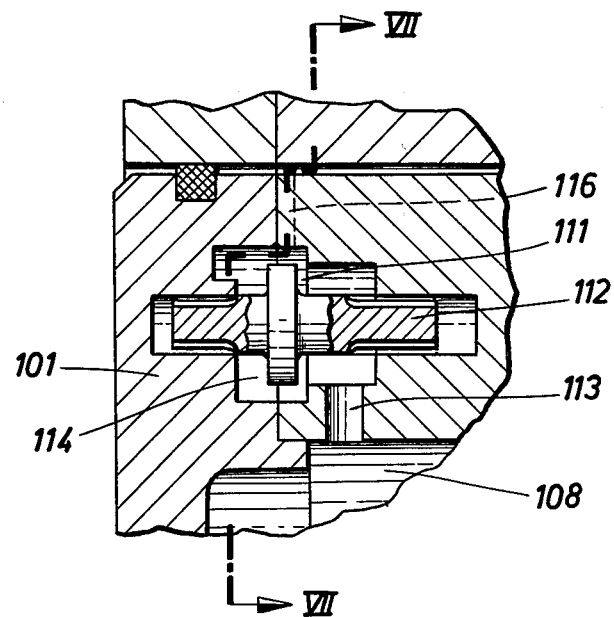
Figure 7:
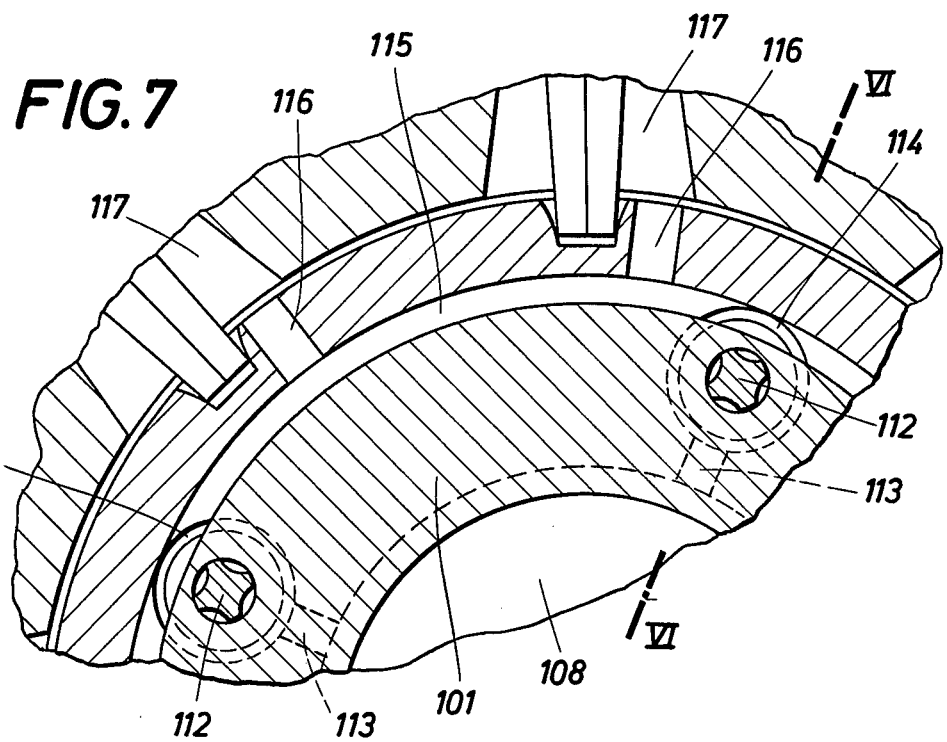

Embodiments of the invention are shown by way of example on the accompanying drawings, in which FIGS. 1 and 2 are, respectively, an axial sectional view taken on line I—I in FIG. 2 and a sectional view taken on a line which is normal to the axis and designated II—II in FIG. 1 and show a coupling mechanism comprising a centrally disposed sliding valve, FIGS. 3 to 5 are diagrams which represent the variation of the pressure, cross-sectional area of flow, and the product of these two parameters, in dependence on time, and FIGS. 6 and 7 are, respectively, an axial sectional view taken on line VI—VI in FIG. 7 and a sectional view taken on a line which is normal to the axis and designated VII—VII in FIG. 6 and show a modified arrangement comprising a plurality of small sliding valves.

In the embodiment shown by way of example in FIGS. 1 and 2, torque is transmitted from an inner member 1 by springs to an outer member, which comprises a shaft 5. The springs 2 are gripped at the outer periphery by means of a clamping ring 3 and a plurality of spacers 4 and are received at their inner end by grooves of the inner part 1. It will be understood that torque could alternatively be transmitted in the opposite direction from the outer member 5 to the inner member 1. The springs 2, spacers 4, and inner member 1 define chambers 6, 7. In accordance with the invention, the inner member 1 contains a cavity 8, which constituted a reservoir for liquid, particularly oil. When the coupling mechanism has been assembled, it is filled with so much oil or another liquid that all spaces disposed outside of the dotted lines in FIGS. 1 and 2 will be filled with oil during a rotation of the coupling mechanism.

Any air which is contained in the chambers 6, 7 before the mechanism is started is displaced into the spaces inside the dotted lines by the oil which is under centifugal force.

When the outer member 5 is rotated relative to the inner member 1, e.g., in the couterclockwise sense, the springs 2 are deflected so that the volume of chambers 6 is decreased and the volume of chambers 7 is increased and part of the oil contained in chambers 6 is displaced into chambers 7 through gaps 9 between the inner and outer members. The damping of the movements of the inner and outer members 1, 5 relative to each other is mainly due to that displacement of oil.

As a result of the movement which has been described, the pressure in the chambers 6 is increased above and the pressure in the chambers 7 is decreased below the pressure in the reservoir 8. Under to the pressure in the chambers 6, part of the oil contained therein flows back to the reservoir 8 through grooves 10, a constricted gap 11, and a sliding valve member 12 having bores 13. This flow results in a pressure drop across the constricted gap 11 so that the sliding valve member 12 is moved to the right in FIG. 1, in the closing sense. A flow in the opposite direction, from the reservoir 8 to the chambers 6, will cause the sliding valve member 12 to move to the left so that the cross-section of flow is increased and the resistance to flow is decreased.

The inner portion of the sliding valve member 12 is tubular and is guided at its inner and outer peripheries in conforming apertures in the inner member 1 and a plate 14. In FIG. 1, the sliding valve member 12 is shown in its left-hand end position. When a flow from the chambers 6 to the reservoir 8 causes the sliding valve member 12 to move to the right, the oil which is initially trapped in the chamber 15 can be displaced through the grooves 16 in the sliding valve member 12 without encountering a substantial resistance until the valve edge 17 covers the left-hand end portion of the grooves 17. Any further movement of the sliding valve member 12 will then be strongly braked. During a movement of the sliding valve member 12 to the left, an analogous operation will prevent an excessive opening of the constricted cross-sectional area 11.

The variation of the flow rate in dependence on time $t$ is represented in FIGS. 3 to 5. FIG. 3 shows the variation of pressure P in chamber 6. The mean value $P_m$ of pressure with respect to time is much higher than the pressure $P_o$ in the reservoir 8. The volumetric flow rate Q between the chamber 6 and the reservoir 8 can be expressed by the expression $$Q = \int K(P-P_o) f \times dt$$

wherein K is a constant, which depends, inter alia, on the viscosity of the oil, the design of the cross-section of flow, and the pressure drop $(P-P_o)$. For the sake of simplicity, it may be assumed that K is a true constant. $f$ designates the constricted cross-sectional area.

Oil flows from the chambers to the reservoir from time $t_o$ to time $t_1$ and in the opposite direction from time $t_1$ to time $t_2$. In case of a constant cross-sectional area $f$, the quantity of liquid which flows out of a chamber 6 from time $t_o$ to time $t_1$ and the quantity of oil which flows into the chamber from $t_1$ to $t_2$ would correspond to the respective hatched areas. The escaping quantity would be much larger so that the chamber 6 would be emptied and the damping action would strongly decrease.

FIG. 4 shows the variation of the constricted cross-sectional area 11 that is exposed by the sliding valve member 12 in dependence on time. A pressure in the chamber 6 in excess of the pressure in the reservoir 8 causes the cross-sectional area 11 or $f$ to decrease, and vice versa. FIG. 5 shows the variation of the product $(P-P_o) \times f$. Because in that figure the areas hatched with lines directed downwardly and to the left and downwardly and to the right, respectively, are equal, the quantity of liquid displaced out of the chamber 6 from time $t_o$ to time $t_1$ is apparently as large as the quantity of liquid which has flown back into the chamber from times $t_1$ to time $t_2$ so that the chamber remains always filled with oil although the mean value $P_m$ of the pressure in the chamber with respect to time exceeds the pressure $P_o$ in the reservoir, which means that the pumping action results in a net flow to the chambers 6.

It is apparent that the measures which have been described enable very high damping torques to be exerted even when there is no supply of oil under pressure. As a result, the oil-filled coupling mechanism may be used as a coupling which requires no supply of oil under pressure. The elimination of the supply of oil under pressure means in many cases a substantial simplification and affords the additional advantage that the dirt contained in the lubricating oil of the engine is no longer centrifugally separated in the coupling mechanism.

In the embodiment shown in FIGS. 6 and 7, the sliding valve member 12 shown in FIGS. 1 and 2 is replaced by a plurality of sliding valve members 112, which are disposed in an inner member 101 of the coupling and/or damping mechanism. Each sliding valve member 112 controls a cross-sectional area 111. The oil flows from a reservoir 108 through bores 113 and the valve-controlled cross-section 111 into an annular chamber 114 and further through an annular groove 115 and radial passages 116 into chambers 117.

The present invention is not restricted to the embodiments which have been described. Specifically, valve members of lift valves may be used rather than the sliding valve members that have been shown.

What is claimed is:
1. A torsionally elastic mechanism which comprises
   (a) a central portion including an inner member,
      (1) the central portion defining a reservoir,
   (b) an outer member elastically coupled to the inner member for rotation therewith,
      (1) the inner and outer members defining therebetween first and second chambers, and
      (2) gap means through which the first and second chambers communicate with each other,
   (c) passage means connecting the reservoir to at least part of the chambers,
   (d) a damping liquid in the reservoir and, upon the rotation of the coupled members, centrifugally flowing from the reservoir into the chambers through the passage means and filling the chambers, the passage means permitting the damping liquid to flow back into the reservoir,
      (1) the inner and outer members being angularly displaceable relative to each other during the rotation and arranged to displace the liquid filling the chambers between the first and second chambers through the gap means during angular displacement so as to perform a damping action, and (e) sliding valve means disposed in the passage means and arranged therein for sliding from a neutral position under the liquid flow,
  (1) the sliding valve means being arranged to present a lower resistance to the flow of the liquid from the reservoir into the chambers than to the flow of the liquid from the chambers into the reservoir.

2. The torsionally elastic mechanism of claim 1, further comprising means for hydraulically braking the sliding of the sliding valve means from the neutral position.

* * * * *